(No Model.) 2 Sheets—Sheet 1.

P. B. DELANY.
GALVANIC BATTERY.

No. 417,814. Patented Dec. 24, 1889.

Witnesses
Geo. W. Breck.
Edward Thorpe.

Inventor
Patrick B. Delany
By his Attorneys
Baldwin, Davidson & Wight (No Model.) 2 Sheets—Sheet 2.

P. B. DELANY.
GALVANIC BATTERY.

No. 417,814. Patented Dec. 24, 1889.

Witnesses
Geo. W. Breck.
Edward Thorpe.

Inventor
Patrick B. Delany
By his Attorneys
Baldwin, Davidson & Wight

UNITED STATES PATENT OFFICE.

PATRICK B. DELANY, OF NEW YORK, N. Y.

GALVANIC BATTERY.

SPECIFICATION forming part of Letters Patent No. 417,814, dated December 24, 1889.

Application filed September 16, 1889. Serial No. 324,123. (No model.)

*To all whom it may concern:*

Be it known that I, PATRICK B. DELANY, of New York, State of New York, have invented certain new and useful Improvements in Electric Batteries, of which the following is a specification.

The invention relates more especially to gravity-batteries, but in part also to other batteries in which the fluid is liable to creep over the tops of the jars and down their sides—such, for instance, as in the Leclanché battery.

In my patent, No. 406,987, I show a battery analogous to that herein described, and the present invention relates to certain improvements and additions to the battery therein disclosed.

The subject-matter claimed is hereinafter specified.

Figure 1:
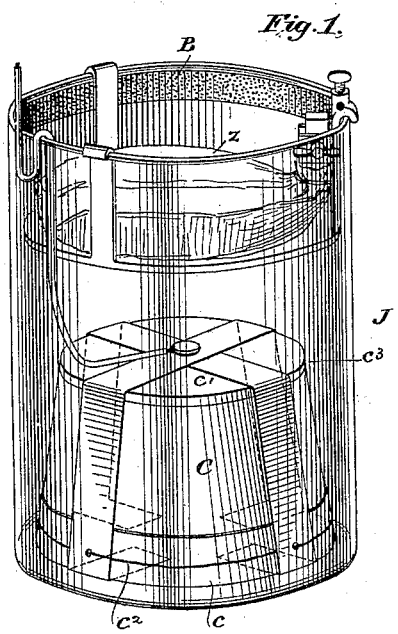
Figure 2:
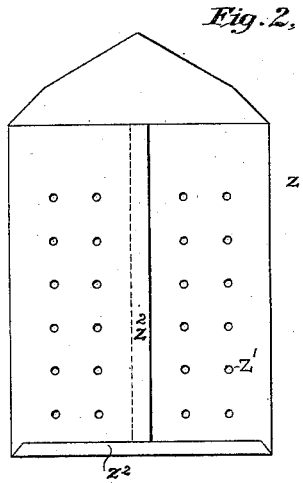
Figure 3:
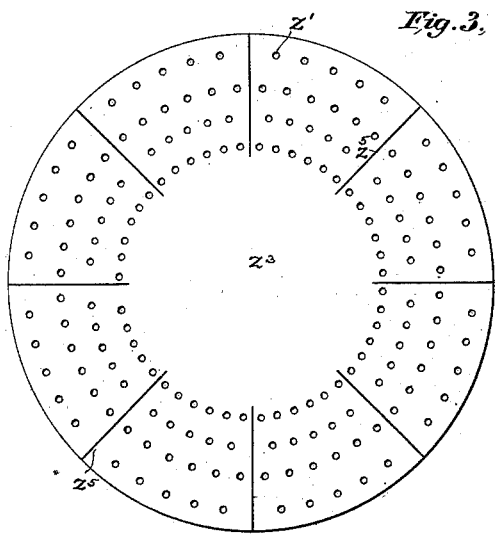
Figure 4:
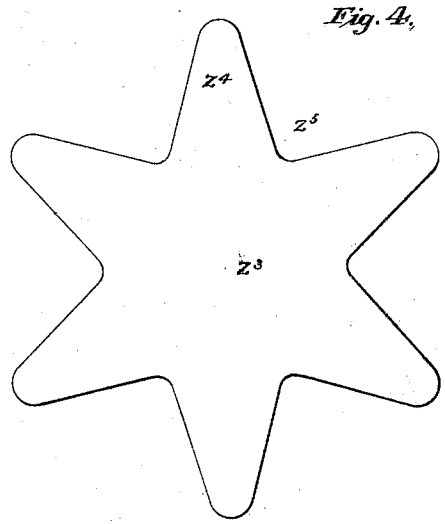
Figure 5:
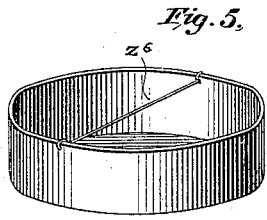
Figure 6:
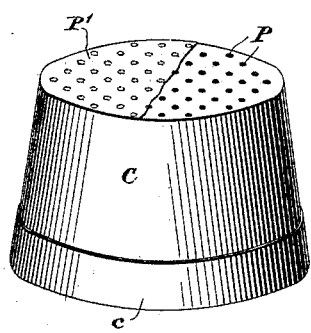
Figure 7:
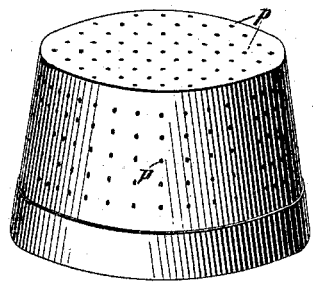
Figure 8:
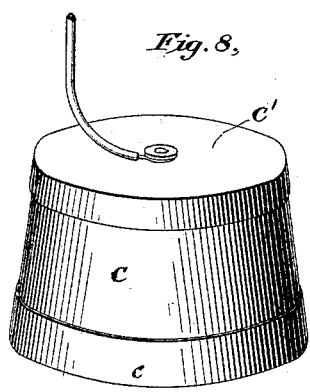
Figure 9:
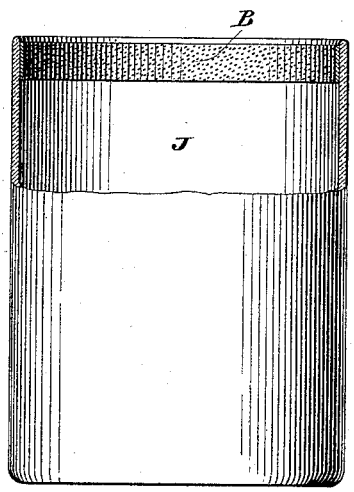
Figure 12:
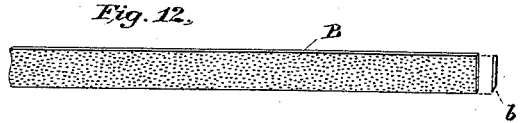
Figure 10:
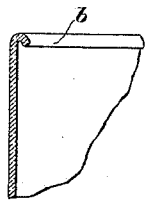
Figure 11:
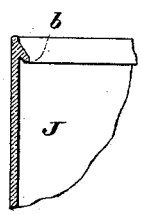
Figure 13:
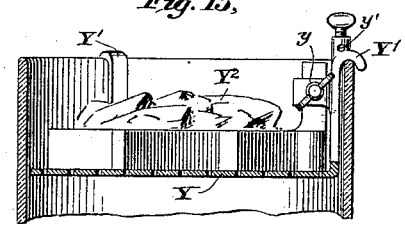

In the accompanying drawings, Figure 1 is a perspective view; Fig. 2, a view of one form of zinc-envelope; Figs. 3, 4, and 5, views of other forms. Figs. 6, 7 and 8 are views showing boxes or envelopes for the sulphate of copper; Fig. 9, a view of a battery-jar, partly broken away, showing the band for preventing the creeping of the battery-fluid. Figs. 10 and 11 are detail views showing a shoulder formed in the jar itself for the same purpose; Fig. 12, a detached view of the band to be applied to the jar; Fig. 13, a sectional view of the upper part of a jar, showing the zinc-supporting frame.

Referring to Fig. 1, the zinc electrode Z is inclosed in a paper envelope $z$. (Shown in detail in Fig. 2.) The portion of the envelope covering the under side of the zinc is unbroken, but the upper side is shown provided with perforations or apertures $z'$. The purposes of this are to protect the under side of the zinc from the action of the sulphate of copper or the solution and gases arising therefrom, as fully set forth in my prior patent, and at the same time to afford free access of the battery-fluid to the zinc through the top of the envelope or sheath. I prefer to employ a paper envelope, and prefer, also, to employ for the protection of the zinc some porous or fibrous material—such as paper or cloth; and when I speak of paper I mean to include all grades of paper up to pasteboard or strawboard, as I find the latter is admirably well adapted for the purpose. I prefer, also, to perforate the top of the envelope, as shown, and I may also close the seam $z^2$ by a paste or cement soluble in the battery-fluid; and in that event I may omit the perforations, since the opening of the seams of the envelope after it has been immersed in the battery-fluid will permit the free access of the fluid to the zinc.

In some forms of gravity-battery, instead of "crow-foot" zincs such as illustrated in Fig. 1, circular zincs having central vertical spindles, by which they are supported, are used; and for such zincs I may employ envelopes or covers, such as shown in Figs. 3 and 4—that is, in Fig. 4 the material forming the envelope is provided with a solid central portion $z^3$ and radially-projecting portions $z^4$, which are to be gathered or drawn up over the top of the zinc and either secured to each other or to the zinc-spindle, as may be desired. The notches or slits $z^5$ permit the free access of the battery-fluid to the zinc. A similar cover or envelope is shown in Fig. 3, where the radial portions $z^4$ of the sheath are provided with perforations; and for any form of zinc I may use a cover substantially such as illustrated in Fig. 5—that is, a cup open at the top—which is to be placed under the zinc and may be held thereon by a wire or cord $z^6$, placed across its top. In all these forms I prefer the material, as above stated, to be porous, so that the battery-fluid will in any event have access to the zinc through the pores or natural openings in the material; but in order that the battery will become more promptly active when set up I provide the openings or perforations in the envelope.

As shown in Figs. 1 and 13, I provide a zinc-supporting frame or device, (shown in this instance as consisting of a horizontal perforated or open-work frame Y,) hung from the edge of the jar by arms or straps Y', having hooked ends embracing the edge of the jar. This frame is made of any suitable metal that will not deteriorate under the action of the battery-fluid and that will not injuriously affect the action of the battery, brass being preferred. The zinc is to lie upon the frame, as shown, and be clamped thereto in electrical connection by means of a socket $y$, having a suitable clamp-bolt, into which the shank of the zinc enters. The wire is to be connected with the frame at the point $y'$, where it is formed with a suitable binding-screw of ordinary construction. Such a frame will last for an indefinite time, and I am enabled to use much cheaper zincs, since it is only necessary to plainly cast them, the expense of boring, tapping, and fitting with a binding-screw being done away with. Further, I am enabled to use in the zinc scraps and broken pieces of old worn-out zincs, which may be laid in upon the crow-foot zinc, as indicated at $Y^2$, Fig. 13. Since the connection between the zinc and the frame is above and out of the battery-fluid, there is no liability of the deterioration of the contact by corrosion, &c. A further advantage attending the use of this device is that the zinc is always held perfectly horizontal and cannot droop, as it does sometimes when supported in the ordinary way directly by the edge of the jar.

As indicated in Fig. 1, the sulphate-of-copper crystals are inclosed in a conical box, preferably so shaped in order that the boxes will "nest" for shipment. In all cases I prefer that the box be of porous material—such, for instance, as ordinary straw-board. It is placed, with its cover $c$ down, in the bottom of the jar, and the metallic copper $C'$ may be applied in the form of two strips crossed at right angles at $c'$ over the top of the box, where they may be riveted together and the conductor attached. They are then bent down along the sides and under the box, and may be secured by a cord or wire $c^2$, passed circumferentially around the box through a hole in one or all of the strips and tied. If the box be of porous material, the fluid of the battery will gradually act upon the sulphate-of-copper crystals, and the battery will become active; or the pasted bottom of the box, which may be joined to the sides at the seam $c^3$, will open more or less under the action of the battery-fluid, as already described in connection with the zinc-envelope; or, as indicated in Fig. 6, I may form relatively-large perforations P in the box, and in that event I prefer to paste over the perforations a thin sheet of paper P', using a paste or cement soluble in the battery-fluid. This arrangement permits the gradual saturation of the sulphate-of-copper crystals, and within a very brief time the free access of the fluid to the crystals through the perforations. In this way I prevent the sudden undue rise of the copper solution when first setting up the battery, as described in my prior patent; or, as in Fig. 7, I may puncture the box with some slender sharp-pointed instrument, the effect of which is to render the box very porous, and at the same time prevent the too sudden rise of the copper solution. Such perforations or apertures are indicated by $p$, and of course the zinc-envelope might be punctured in the same way.

With any of the forms of boxes described I may apply the metallic copper $C'$ in the form of an open inverted cup placed over the top of the box, as indicated in Fig. 8.

In my prior patent I described the sanding or roughening of the lip of the jar to prevent the creeping of the battery-fluid. This method is very efficient; but I have also found that an abrupt shoulder upon the interior lip of the jar serves also admirably well to prevent this evil. In order to combine the method described in my patent with my present improvement, a band of any suitable material B, which may be sanded, as indicated in Figs. 9 and 12, or may not be, can be pasted or cemented to the interior lip of the jar, as shown in Fig. 9. This band may consist of any suitable material—such as rubber or vulcanized fiber or paper—and may be coated with cement upon one face for its attachment to the jar. By preference, I would employ a cement that becomes adhesive upon slightly warming the band. By this means I may with ease apply my improvements to battery-jars now in use. I may, however, instead of employing a separate band to be applied to the interior lip of the jar, form an annular inwardly-projecting lip or shoulder $b$ in the jar itself, as shown in Fig. 11, and I would, by preference, have this flange inclined downwardly; or, as shown in Fig. 10, the lip $d$ may be formed by curving or turning inwardly the edge of the jar. The band B, which is shown detached and broken away in Fig. 12, may have its lower edge, which is to form the shoulder $b$, beveled so that the under face of the shoulder will incline downwardly. This downward inclination of the flange or shoulder tends to throw down or return the creeping solution to the jar.

I claim as my invention—

1. In a battery-cell, the combination, substantially as set forth, of the zinc electrode enveloped in a sheath or cover having an opening or openings for the free access of the battery-fluid to the top of the zinc.

2. In a battery-cell, the combination, substantially as set forth, of the zinc electrode, and a porous cover or envelope having a solid portion arranged under the zinc, and an opening or openings above said solid portion which permit the free access of the battery-fluid to the zinc.

3. In a battery-cell, the combination, substantially as set forth, of the zinc electrode and a porous envelope inclosing the same and having seams which open under the action of the battery-fluid.

4. In a battery-cell, a straw-board box containing sulphate-of-copper crystals.

5. In a battery-cell, a box containing the chemical element, which box has seams or apertures which open under the action of the battery-fluid.

6. In a battery-cell, a box envelope or cover containing the soluble chemical element or electrode and having apertures or punctures therein independent of the natural porosity of the material of which it is formed.

7. A battery-cell having attached or fastened therein an annular band for the purpose of preventing the creeping of the battery-fluid.

8. In a battery-cell, the combination, substantially as set forth, of the jar, the zinc, and the zinc-supporting frame in the jar and upon which the zinc lies.

9. The combination, substantially as set forth, of the zinc-supporting frame having a socket or clamping device for connection with the zinc above the battery-fluid, and a binding screw or clamp for the wire, and the zinc resting in the frame.

10. The combination of a jar, its zinc, and zinc-supporting device hung in the jar from the edge of the jar, and upon which the zinc within the jar lies.

In testimony whereof I have hereunto subscribed my name.

PATRICK B. DELANY.

Witnesses:
EDWARD C. DAVIDSON,
MAMIE J. KELLEY.